UNITED STATES PATENT OFFICE.

GADIENT ENGI, OF BASEL, SWITZERLAND, ASSIGNOR TO THE FIRM OF SOCIETY OF CHEMICAL INDUSTRY IN BASLE, OF BASEL, SWITZERLAND.

PROCESS OF MAKING MONOBROMO INDIGO.

No. 888,230.   Specification of Letters Patent.   Patented May 19, 1908.

Application filed March 27, 1907. Serial No. 364,908.

*To all whom it may concern:*

Be it known that I, GADIENT ENGI, doctor of philosophy and chemist, a citizen of the Swiss Republic, and resident of Basel, Switzerland, have invented a new and useful Process of Making Monobromo Indigo, of which the following is a full and exact specification.

In my applications for United States Patent Ser. No. 364019 & 364020, filed March 23 1907, I described the manufacture of tri- and tetrabromoderivatives of indigo consisting in treating indigo, mono-or dibromindigo indigo at a raised temperature with the appropriate proportion of bromin in presence of a suitable indifferent diluent or solvent, particularly of nitrobenzene.

I have found that this process may also be applied advantageously for producing a monobromoderivative of indigo, the heating of indigo with the theoretically necessary quantity of bromin (2 atomic proportions) in presence of nitrobenzene furnishing a monobromoderivative in a very pure condition and with a quantitative out-put.

By employing the theoretically necessary quantity of bromin, the new process gives directly a mono-bromo-indigo containing the exact percentage of bromin (about 24% of Br.) and corresponding to the formula $C_{16}H_9O_2N_2Br$.

Example: 5 parts of indigo, 50 parts of nitrobenzene and 3 parts (2 atomic proportions) of bromin are well mixed together and heated in a reflux apparatus in an oil bath in such a manner that the temperature of the latter rises to 225° C. in the course of about an hour; the temperature of the bath is then maintained at 226—228° C. for about 1½—2 hours, much hydrogen bromid being evolved. After cooling and filtering the solid monobromo-derivative of indigo is washed with alcohol and dried; it is thus obtained as a beautiful blue crystalline powder, in nearly quantitative yield and of satisfactory purity, containing about 24% bromid (theoretical quantity of bromin 23.5%)

When treated with alkaline reducing agents, the new product yields easily and smoothly a bright yellow vat, wherein cotton is dyed blue tints which are considerably redder, more vivid and faster to washing and to chlorin than the tints obtained in vats prepared from the monobromo-derivative known in commerce as Indigo R.

What I claim is:

The herein described process for the manufacture of a monobromoderivative of indigo by heating indigo with two atoms of bromin in presence of nitrobenzene.

In witness whereof I have hereunto signed my name this 11 day of March 1907, in the presence of two subscribing witnesses.

GADIENT ENGI.

Witnesses:
  GEO. GIFFORD,
  AMAND BRANN.